United States Patent [19]
Okuda et al.

[11] Patent Number: 5,161,816
[45] Date of Patent: Nov. 10, 1992

[54] SUSPENSION CONTROL APPARATUS

[75] Inventors: Eiichiro Okuda, Habikino; Masuo Takigawa, Ikuno, both of Japan

[73] Assignee: Matsushita Electric Industrial Co., Ltd., Kadoma, Japan

[21] Appl. No.: 657,844

[22] Filed: Feb. 20, 1991

[30] Foreign Application Priority Data

Jun. 15, 1990 [JP] Japan ................................. 2-157986

[51] Int. Cl.$^5$ .............................................. B60G 17/08
[52] U.S. Cl. ................................ 280/707; 364/424.05
[58] Field of Search ................... 280/707, 703, 772; 364/424.05

[56] References Cited

U.S. PATENT DOCUMENTS

| | | | |
|---|---|---|---|
| 4,671,112 | 9/1987 | Kimura et al. | 73/505 |
| 4,805,102 | 2/1989 | Ise et al. | 280/707 |
| 4,888,696 | 12/1989 | Akatsu | 364/424.05 |
| 4,943,084 | 7/1990 | Fukunaga et al. | 280/707 |
| 5,058,017 | 10/1991 | Adachi et al. | 280/707 |

FOREIGN PATENT DOCUMENTS

| | | |
|---|---|---|
| 0167159 | 1/1986 | European Pat. Off. . |
| 0428096 | 5/1991 | European Pat. Off. . |
| 63-49513 | 3/1988 | Japan ................................. 280/707 |
| 63-68413 | 3/1988 | Japan . |
| 2215287 | 3/1988 | United Kingdom ................. 280/707 |

OTHER PUBLICATIONS

F. Sugasawa, et al., "Electronically Controlled Shock Absorber System Used as a Road Sensor Which Utilizes Super Sonic Waves", SAE The Engineering Resource for Advancing Mobility, Sep. 23-26, 1985.

Primary Examiner—Karin L. Tyson
Attorney, Agent, or Firm—Cushman, Darby & Cushman

[57] ABSTRACT

A suspension control apparatus for a vehicle having at least one shock absorber with a controllable damping force. The suspension control apparatus includes a roll angular velocity sensor for detecting angular velocity about a roll axis of the vehicle, and control means for determining a bumpy-road driving state of the vehicle when an accumulation time exceeds a predetermined accumulation time. The control means adjusts the damping force of the shock absorber during the bumpy road driving state. The accumulation time represents the amount of time the angular velocity exceeds a predetermined angular velocity range during a first predetermined time period.

3 Claims, 5 Drawing Sheets

SUSPENSION CONTROL APPARATUS

FIELD OF THE INVENTION AND RELATED ART STATEMENT

1. Field of the Invention

The present invention relates to a suspension control apparatus for a controlling a vehicle posture by changing damping force of a shock absorber to keep a wide road contact area with the vehicle tires and to decrease a vibration of the vehicle when the vehicle is driving on an undulating road (bumpy road).

2. Description of the Related Art

When a vehicle is driving on a very bumpy road, the vehicle makes periodic rolling motions due to vibration of the tires in a vertical direction, through receipt of severe shock. The result is that the road contact area of the tires decreases. This makes driving stability and riding comfort poor during bumpy-road driving such that the vehicle receives continuous vibrations or shocks.

In order to solve such problems, a conventional suspension control apparatus detects the vibration of the vehicle or shock, by inferring from a change of the vehicle height or a change of stroke of shock absorbers. The damping force of the shock absorbers for restraining the vibration or shock is controlled by signals in response to the change of the vehicle height or the change of stroke of the shock absorbers during bumpy road travel. The result is that driving stability and riding comfort are improved.

However, in case of measuring the distance between the bottom of vehicle body and road surface in order to detect the change of vehicle height, the distance measuring instrument, e.g. ultra-sonic sensors, have to be mounted on the vehicle body near the road surface. Therefore, the ultra-sonic sensors are liable to be covered with mud, dust or snow, and the ultra-sonic sensors will malfunction. Even if the ultra-sonic sensors are operated in a clean state, output signals from the ultra-sonic sensors may show an incorrect vehicle posture, because the output signals only represent the interval (distance) between the road surface and the part of vehicle body where the ultra-sonic sensor is mounted.

In the conventional suspension control apparatus wherein the stroke of the shock absorber is detected, as a voltage output with a variable resistor in order to detect the vehicle height. This has some problems in that a sliding part of the variable resistor may wear away. Furthermore, plural detecting devices are mounted on plural shock absorbers, respectively, and the signal processing needs become a complicated operation. Therefore, such conventional suspension control apparatus lacks durability and reliability.

The Japanese published unexamined patent application No. Sho 63-68413 (Tokkai Sho 63-68413) discloses another conventional suspension control apparatus having a vehicle speed sensor and three angular velocity sensors for directly detecting a vehicle motion behavior. The three angular velocity sensors detect a yaw angular velocity, a pitch angular velocity and a roll angular velocity. Thereby the vehicle behavior is grasped and the damping force of the shock absorber is controlled in response to the vehicle behavior.

The above-mentioned yaw angular velocity is an angular velocity in a rotation about a vertical line (yaw axis) at a center of the vehicle. The pitch angular velocity is an angular velocity in a rotation about a lateral axis (pitch axis) of the vehicle. The roll angular velocity is an angular velocity in a rotation about a longitudinal axis (roll axis) of the vehicle.

This conventional suspension control apparatus (Tokkai Sho 63-68413), which operates to decrease a rolling motion of the vehicle behavior by using these signals from three angular velocity sensors, has the following problems. An arithmetic unit in the conventional suspension control apparatus carries out a complicated computing operation using the output signals from the yaw angular velocity sensor, the pitch angular velocity sensor and the roll angular velocity sensor. Therefore, this suspension control apparatus needs a considerable time for computing data. For example, when a CPU (Central Processing Unit) of 8 bits is used as the arithmetic unit, the operation time for computation of a control signal, namely, the time period between reception of detection signals and issuance of output signal to the actuators takes about 20 msec. Therefore, the conventional suspension control apparatus requires the use of a higher speed CPU as the arithmetic unit, (i.e. a CPU of 16 bits) to decrease rolling motion during driving. However, to use such a high speed CPU in the vehicle unduly increases the manufacturing cost of the vehicle.

OBJECT AND SUMMARY OF THE INVENTION

An object of the present invention is to provide a suspension control apparatus which can achieve a high stable vehicle behavior and at the same time improved riding comfort of the vehicle when traveling on a bumpy-road without an increase in manufacturing cost.

In order to achieve the above-mentioned object, the suspension control apparatus of the present invention comprises:

a roll angular velocity sensor for detecting angular velocity about a roll axis of the vehicle, bumpy-road driving detection means which detects bumpy-road driving of the vehicle based on output signal of the roll angular velocity sensor, and shock absorber means whereof damping force is controlled in response to the output signal from the bumpy-road driving detection means.

In accordance with the suspension control apparatus of the present invention, a bumpy-road driving state from the vehicle is detected by output signals of the roll angular velocity sensor. Therefore, the suspension control apparatus of the present invention does not malfunction due to mud, dust or snow on the road. Additionally, the vehicle posture change can be correctly detected. Furthermore, the suspension control apparatus of the present invention does not malfunction due to abrasion of a sliding part e.g. variable resistor used for detecting stroke of the shockabsorber.

As a result, riding comfort and driving stability of the vehicle posture are improved by using the suspension control apparatus of the present invention; which is simple in construction and low in cost.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Hereafter, preferred embodiments of the suspension control apparatus of the present invention are elucidated with reference to the accompanying drawings of FIG. 1 to 5.

Figure 1:
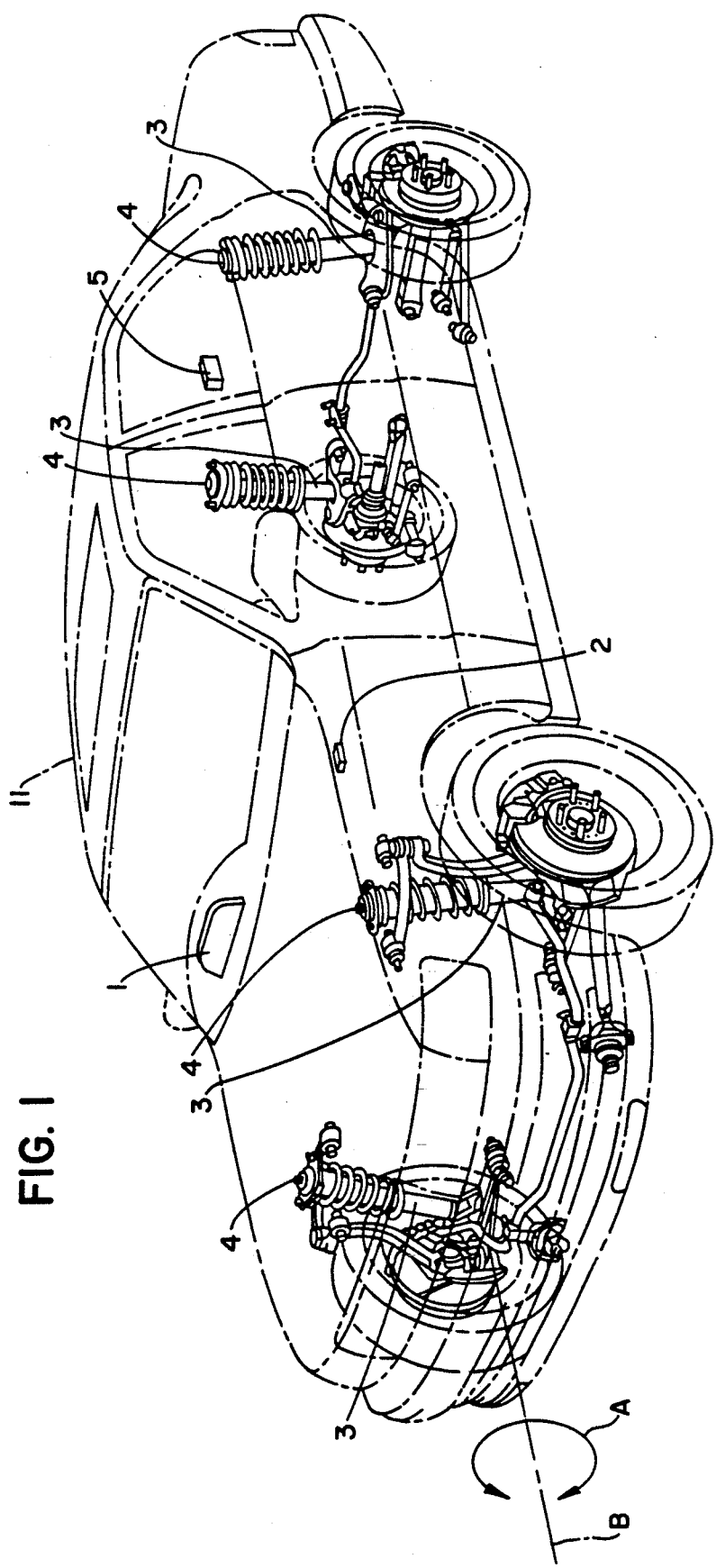
FIG. 1 is a perspective view showing the principal parts of a suspension control apparatus of the present invention in a vehicle (the vehicle illustrated by alternating long and short dash lines)

FIG. 1 is a perspective view showing a principal part of the suspension control apparatus which is disposed in a vehicle 11 shown by alternating long and short dashed lines. The suspension control apparatus comprises a vehicle speed sensor 1, a roll angular velocity sensor 2, shock absorbers 3, actuators 4 and a controller 5. The vehicle speed sensor 1, which is disposed in a front grill adjacent a speed meter, produces a signal of vehicle speed by detecting the revolution speed of an output shaft of a gearbox in the vehicle 11. The roll angular velocity sensor 2 is provided to detect an angular velocity of rotation about a longitudinal and horizontal line of the vehicle body at substantially a center of the vehicle 11, that is about a roll axis B of the vehicle 11. The directions of the rotation are shown with an arrow A in FIG. 1. The roll angular velocity sensor 2, for instance described in U.S. Pat. No. 4,671,112, which issued Jun. 9, 1987 and granted to the same assignee, is usable. The shock absorbers 3 damp the force received by wheels of the vehicle 11. For instance, the shock absorbers 3 are a hydraulic active suspension and their damping rate is controlled by controlling hydraulic values using an electromagnet. The actuators 4, which are provided on the shock absorbers 3, control the damping force of the shock absorbers 3. The controller 5, which is disposed in an appropriate space, such as under the back seat or in the trunk, produces the output signals for controlling the damping force of the shock absorbers 3. The actuators 4 operate the shock absorber 3 by receiving the output signals, which are produced by the controller 5 in response to the output signals of the vehicle speed sensor 1 and the roll angular velocity sensor 2.

Figure 2:
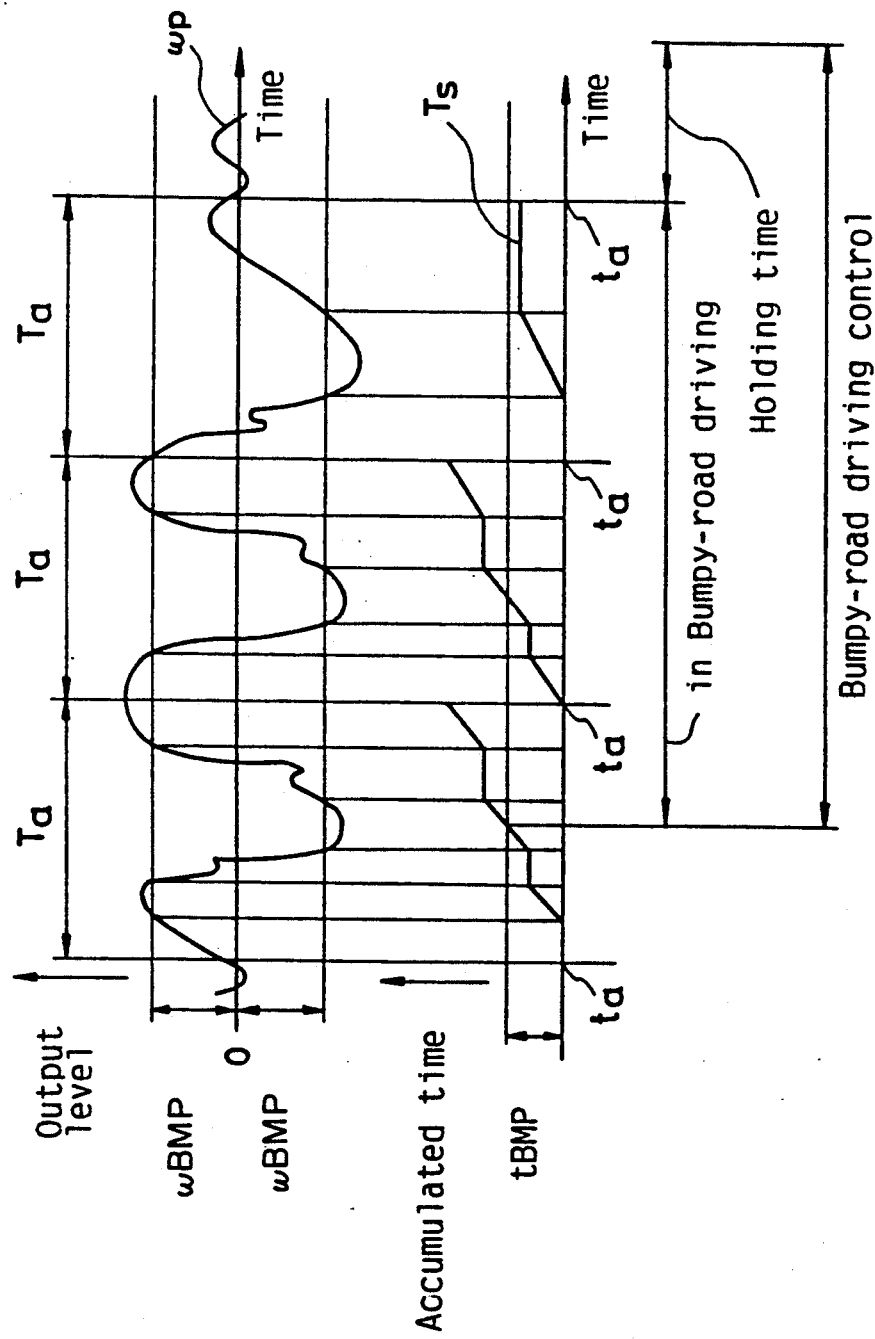
FIG. 2 is a graph of a typical output signal of the roll angular velocity sensor and accumulated time detecting bumpy-road driving of the vehicle.

FIG. 2 is a graph of a typical output signal $\omega p$ of the roll angular velocity sensor 2 when the vehicle 11 is driven on a very bumpy road, that is, when the vehicle 11 receives continuous shocks. And, FIG. 2 shows how bumpy-road driving is inferred or estimated from the output signal $\omega p$ of the roll angular velocity sensor 2. In FIG. 2, Ta which is constant time, e.g. 1.5 seconds, is a time interval for judging the state of bumpy-road driving. Bumpy-road driving is inferred at every constant time interval Ta, namely at each point ta. Ts is a time period defined by accumulating a respective time period when the absolute value $|\omega p|$ of the output signal $\omega p$ of the roll angular velocity sensor 2 reaches or exceeds the predetermined value $\omega BMP$ during each constant time interval Ta. When the accumulated time period Ts, namely bumpy-road driving time reaches or exceeds the predetermined time tBMP, it is judged that the vehicle 11 is in bumpy-road driving. And the actuators 4 are immediately driven to change the damping force of the shock absorbers 3.

That is, the bumpy-road driving state is determined by the conditions shown by the following formula (1):

$$Ts \geq tBMP \tag{1}$$

The following formulas (2) and (3) show the operating parameters of the above-mentioned predetermined value $\omega BMP$ and predetermined time tBMP which are found preferable through our experiments:

$$|\omega p| \geq 5.3 \text{deg/sec} \tag{2}$$

and $$Ts \geq 0.4 \text{sec} \tag{3}$$

Figure 3:
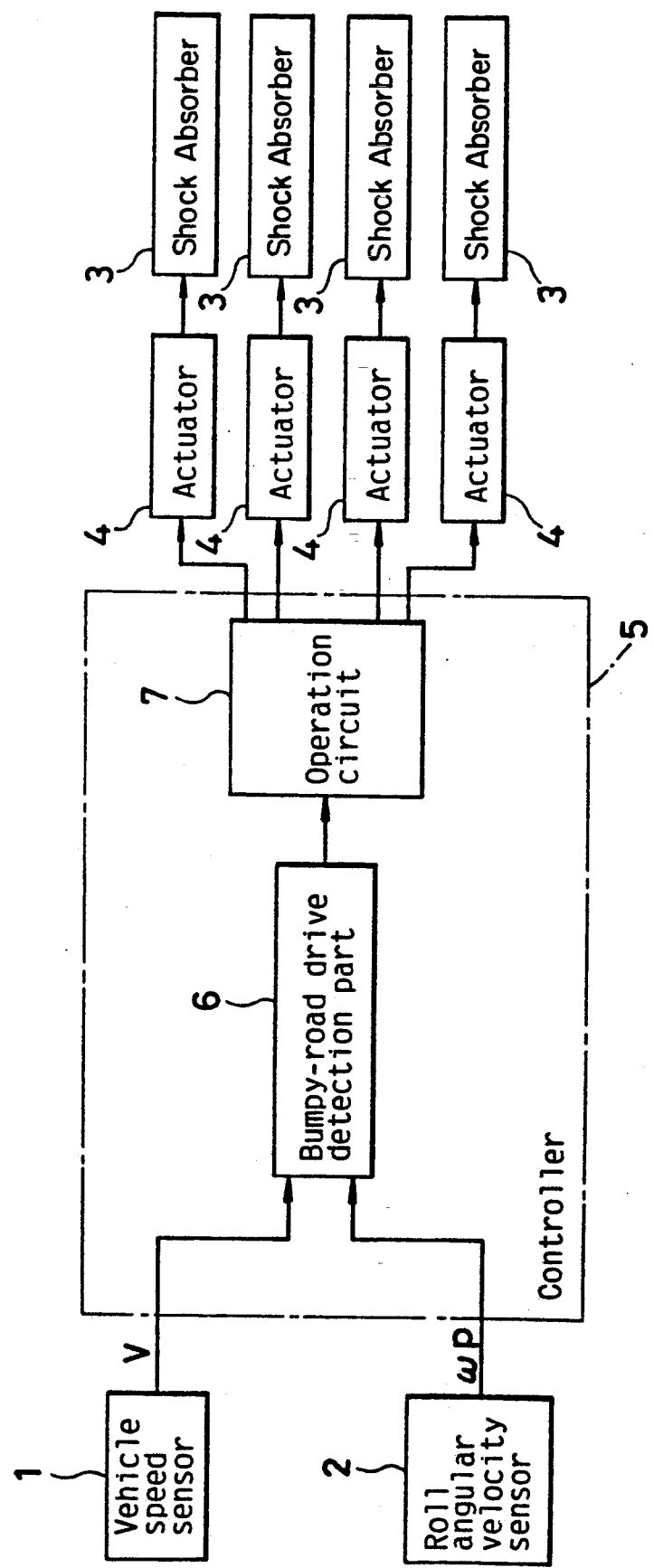
FIG. 3 is a block diagram of the suspension control apparatus shown in FIG. 1.

FIG. 3 shows the block diagram of the suspension control apparatus of the present invention in FIG. 1.

The controller 5 provides the bumpy-road driving detection part 6 for detecting bumpy-road driving and the operation circuit 7 for driving the actuators 4. In actual example, the controller 5 is constituted substantially by an A/D converter, an arithmetic unit, such as a logical circuit having a CPU, a ROM and a RAM.

The bumpy-road driving detection part 6 detects the bumpy-road driving of the vehicle 11 by using the output signal $\omega p$ of the roll angular velocity sensor 2, as shown in FIG. 2. The bumpy-road driving detection part 6 produces an output signal to the operation circuit 7 for controlling the vehicle posture, to improve the driving stability and riding comfort.

The operation circuit 7, which receives the control signal from the bumpy-road driving detection part 6, drives the actuators 4 to change a damping rate of the shock absorbers 3. In this embodiment, the damping rate during bumpy-road driving is fixed at 0.4.

Apart from the above-mentioned embodiment wherein the shock absorbers 3 during bumpy-road driving are controlled at the predetermined constant damping rate, a modified embodiment may be such that the shock absorbers during bumpy-road driving are controlled by the damping rate in response to vehicle speed.

The damping rate is given by the following formula (4);

$$\text{Damping rate} = \frac{C}{2\sqrt{M \cdot K}}, \tag{4}$$

where
C is the damping coefficient $$\left( SI \text{ units: } \frac{N \cdot \text{sec}}{m} \right)$$

of the shock absorbers 3 during normal straight driving of the vehicle 11,

M is the sprung mass $$\left(SI \text{ units: } \frac{N \cdot \sec}{N}\right)^2$$

and

K is the spring constant (SI units: N/m) of the suspension.

Figure 4:
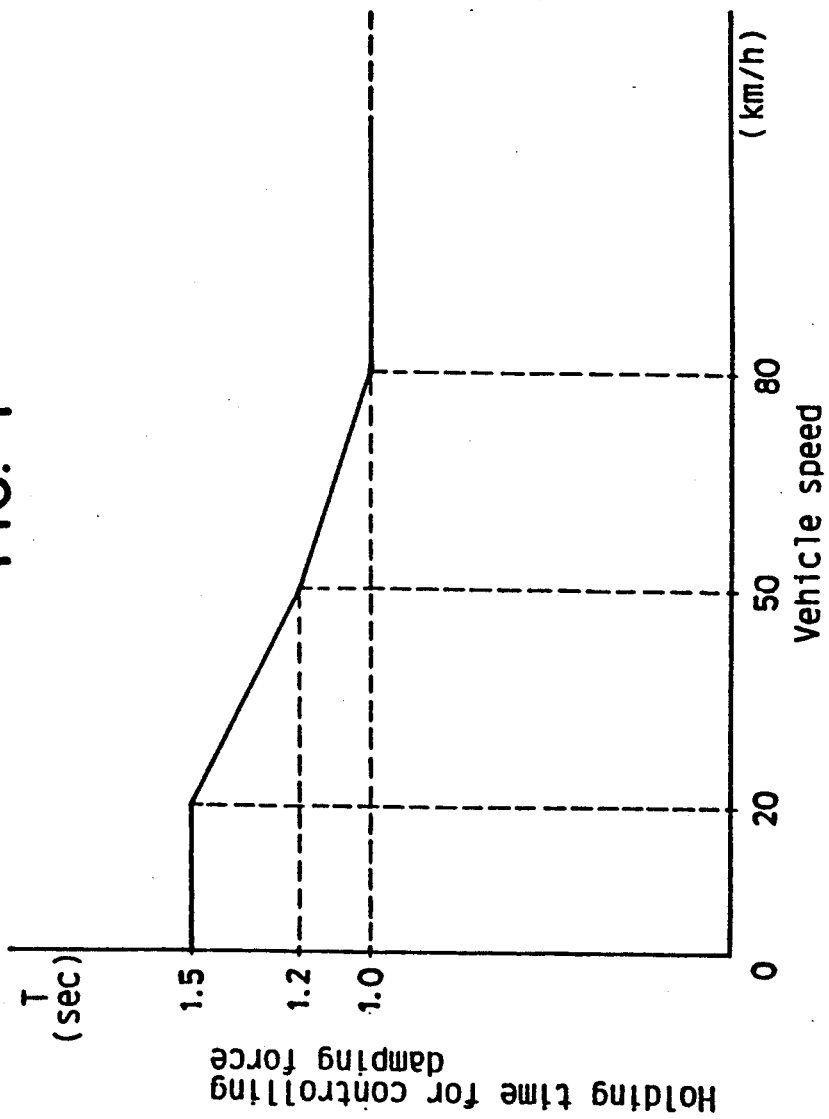
FIG. 4 is a characteristic diagram of the holding time for controlling damping force of the suspension control apparatus shown in FIG. 1.

FIG. 4 shows a characteristic diagram of the holding time T for retaining the damping force after completion of bumpy-road driving. Since the rolling of the vehicle 11 remains a short time after bumpy-road driving, due to inertia and suspension characteristics of the vehicle 11, the vehicle 11 needs retention of the controlled (increased) damping force of the shock absorbers 3 for the predetermined holding time T.

As shown in FIG. 4, the holding time T in which the controlled damping force is retained is set shorter as the vehicle speed becomes the higher. And, when the vehicle speed is above 80 km/h, the holding time T is set to be constant, such as at 1.0 second. This setting of the operation parameters are experimentally found preferable.

Apart from the above-mentioned embodiment wherein the holding time T is decided in response to the vehicle speed, a modified embodiment may be such that the holding time T is set up constant, or alternatively is set up so as to respond to the displacement length (distance) of the vehicle 11 after completion of bumpy-road driving. On the contrary to the above-mentioned embodiments, in some kinds of vehicles, such as a coach or a large truck, the holding time T may be set up to become larger as the vehicle speed increases.

Figure 5:
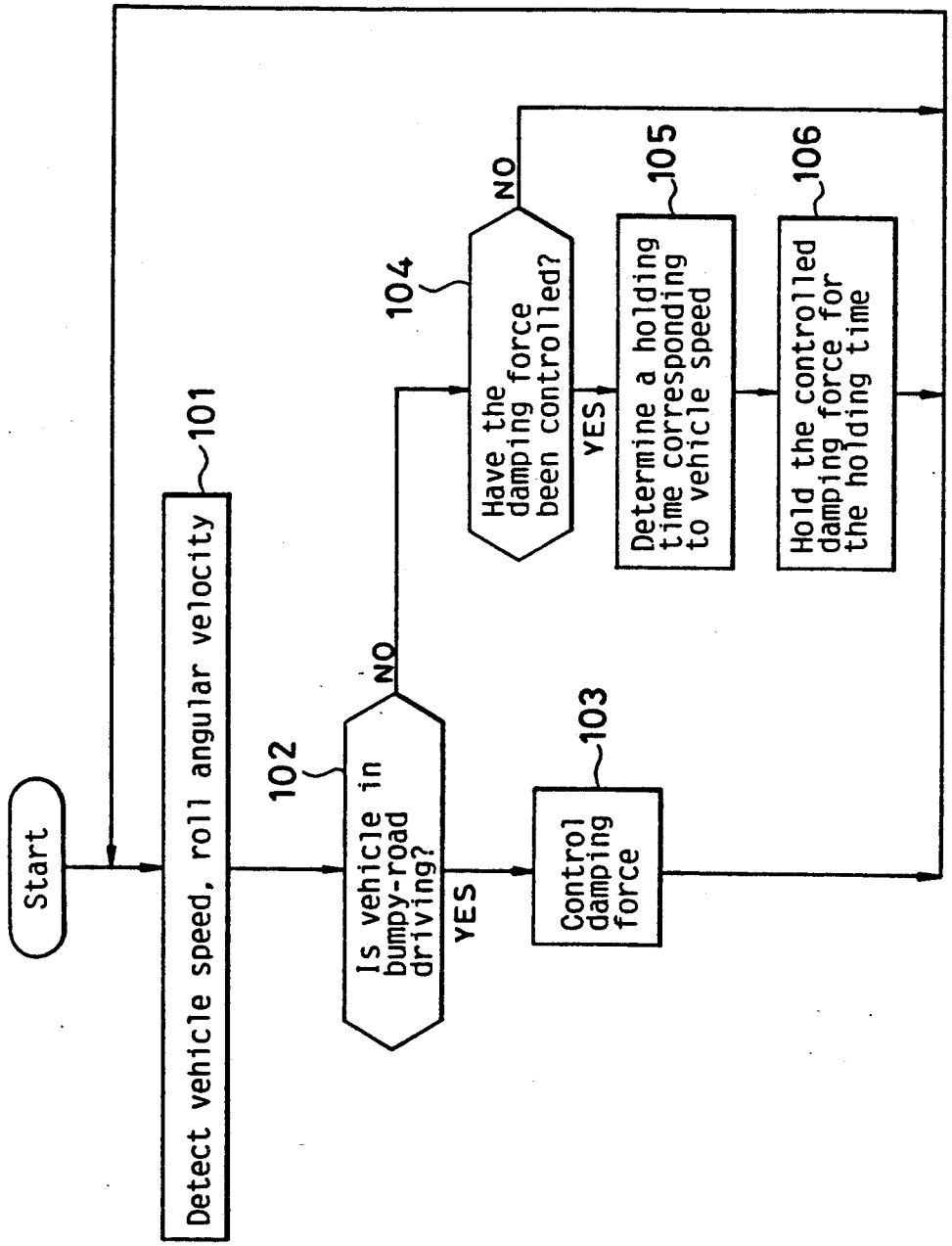
FIG. 5 is a flow chart of operation of the suspension control apparatus according to the present invention.

FIG. 5 shows a flow chart of operation of the controller 5 of the suspension control apparatus of the present invention.

In step 101 of FIG. 5, the output signal V from the vehicle speed sensor 1 and the output signal ωp from the roll angular velocity sensor 2 are detected. Next, in step 102, it is judged whether the vehicle 11 is in bumpy-road driving or not. In other words, when the aforementioned accumulated time period Ts, bumpy-road driving time, reaches or exceeds the predetermined time tBMP at the judging time ta, it is judged that the vehicle 11 is driving on bumpy road.

When the controller 5 decides "YES" in step 102, the suspension control apparatus operates to increase the damping force of the shock absorbers 3 in step 103 in order to enlarge the road contact area of the tires and to improve riding comfort. As a result, the driving stability of the vehicle 11 is assured even if the vehicle 11 is driven on a bumpy-road.

When the controller 5 in step 102 decides "NO", which designates that the vehicle 11 is not driving on a bumpy road, the controller 5 judges whether the shock absorbers 3 have been controlled or not in step 104. When the controller 5 in step 104 decides "YES", which designates that bumpy-road driving has finished, a suitable holding time T (which is the time wherein the damping force is controlled (increased) after bumpy-road driving) is determined in response to the output signal V from the vehicle speed sensor 1 in step 105. The holding time T has been aforementioned in reference to the waveform shown in FIG. 4. And, in step 106, the controlled damping force of the shock absorbers 3 is kept for the holding time T after bumpy-road driving has been finished.

After completion of the damping force holding operation of the shock absorbers 3, for the holding time T, the shock absorbers 3 return to normal damping force which lasts until the suspension control apparatus detects the next bumpy-road driving state.

On the contrary, in step 104, when the controller 5 judges that the shock absorbers 3 have not yet been controlled to increase the damping force for bumpy-road driving, the shock absorbers 3 are kept at a normal damping force continuously.

The afore-mentioned problems of malfunctioning ultrasonic sensors due to mud or snow, or malfunctions due to abrasion in variable resistors in the conventional suspension control apparatus are solved. The suspension control apparatus of the present invention detects bumpy-road driving by using only two signals, namely, the output signal V of the vehicle speed sensor 1 and the output signal ωp of the roll angular velocity sensor 2.

And, in the suspension control apparatus of the present invention, the time required for computing by the controller 5 is short. The controller 5 carries out a simple computing operation by using the output signals of the vehicle speed sensor and the only one angular velocity sensor. For example, in case of using a CPU of 8 bits as the arithmetic unit, the operation times for computation of a control signal, namely the time period between reception of detection signals into the arithmetic unit and issuance of output signal to the actuators 4 takes about only 5 msec. Accordingly, the suspension control apparatus of the present invention can timely and effectively control the damping force to increase in response to a rotation around the roll axis B of the vehicle 11 when the vehicle 11 is driven on a bumpy road.

Furthermore, driving stability and riding comfort are assured by the elimination of rolling of the vehicle 11 after completion of bumpy-road driving, since the suspension control apparatus of the present invention maintains for a short time the bumpy road driving damping force of the shock absorbers 3 after bumpy-road driving is completed.

Although the present invention has been described in terms of the presently preferred embodiments, it is to understood that such disclosure is not to be interpreted as limiting. Various alterations and modifications will no doubt become apparent to those skilled in the art after having read the above disclosure. Accordingly, it is intended that the appended claims be interpreted as covering all alterations and modifications which fall within the true spirit and scope of the invention.

What is claimed is:

1. A suspension control apparatus for a vehicle comprising:
    at least one shock absorber means having a controllable damping force;
    a roll angular velocity sensor for detecting angular velocity about a roll axis of said vehicle;
    control means for determining a bumpy-road driving state of said vehicle when an accumulation time exceeds a predetermined accumulation time and adjusting said damping force during said bumpy road driving state; said accumulation time representing an amount of time said angular velocity exceeds a predetermined angular velocity range during a first predetermined time period.

2. An apparatus as in claim 1, wherein said control means maintains said adjusted damping force for a second predetermined time period after said bumpy-road driving state has ended.

3. An apparatus as in claim 2, further comprising:
    a vehicle speed sensor for detecting a speed of said vehicle;
    wherein said second predetermined time period is determined based on said vehicle speed.

* * * * *